US010540432B2

(12) United States Patent
Stucker

(10) Patent No.: US 10,540,432 B2
(45) Date of Patent: Jan. 21, 2020

(54) ESTIMATED READING TIMES

(71) Applicant: Microsoft Technology Licensing, LLC, Redmond, WA (US)

(72) Inventor: Brian Scott Stucker, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/442,579

(22) Filed: Feb. 24, 2017

(65) Prior Publication Data

US 2018/0246866 A1    Aug. 30, 2018

(51) Int. Cl.
| G06F 17/20 | (2006.01) |
| G06F 17/24 | (2006.01) |
| G06K 9/00 | (2006.01) |
| G06K 9/18 | (2006.01) |

(52) U.S. Cl.
CPC ....... *G06F 17/241* (2013.01); *G06K 9/00449* (2013.01); *G06K 9/00469* (2013.01); *G06K 9/18* (2013.01)

(58) Field of Classification Search
None
See application file for complete search history.

(56) References Cited

U.S. PATENT DOCUMENTS

| 5,801,685 A | * | 9/1998 | Miller | ............. | G11B 27/034 |
| | | | | | 715/202 |
| 5,977,974 A | * | 11/1999 | Hatori | ............. | G06F 3/0481 |
| | | | | | 715/839 |
| 8,296,422 B2 | | 10/2012 | Rimon | | |
| 8,874,731 B1 | | 10/2014 | Puppin | | |
| 9,268,858 B1 | | 2/2016 | Yacoub et al. | | |
| 9,430,776 B2 | | 8/2016 | Puppin | | |
| 2002/0002461 A1 | * | 1/2002 | Tetsumoto | ............. | G10L 13/08 |
| | | | | | 704/270.1 |

(Continued)

FOREIGN PATENT DOCUMENTS

| WO | 2011128412 A1 | 10/2011 |
| WO | 2014026058 A1 | 2/2014 |
| WO | 2014093104 A1 | 6/2014 |

OTHER PUBLICATIONS

Holland, Arienne, "How Estimated Reading Times Increase Engagement With Content", http://marketingland.com/estimated-reading-times-increase-engagement-79830, Published on: Apr. 14, 2014, 6 pages.

(Continued)

*Primary Examiner* — Shahid K Khan
(74) *Attorney, Agent, or Firm* — Merchant & Gould P.C.

(57) ABSTRACT

Reading time indicators for display within a content authoring application are provided herein. Estimates of reading times for the content item as a whole, and of sections thereof, are created as the author manipulates content within a document. These estimates are displayed as indicators within the content authoring application and the document, to inform the author of how long a reader is expected to take when consuming the document. The functionality of the computing device running the content authoring application is thus improved by providing content limit indicators related to consumption time.

21 Claims, 9 Drawing Sheets

(56) References Cited

U.S. PATENT DOCUMENTS

| | | | | |
|---|---|---|---|---|
| 2003/0004723 | A1* | 1/2003 | Chihara | G10L 13/08 704/260 |
| 2003/0159148 | A1* | 8/2003 | Farineau | H04H 20/28 725/49 |
| 2004/0205614 | A1* | 10/2004 | Keswa | H04L 63/08 715/239 |
| 2006/0095252 | A1* | 5/2006 | Takagi | G06F 3/16 704/200 |
| 2012/0210203 | A1 | 8/2012 | Kandekar et al. | |
| 2012/0324393 | A1 | 12/2012 | Mbenkum et al. | |
| 2014/0162243 | A1 | 6/2014 | Lamkin | |
| 2016/0124909 | A1* | 5/2016 | Basson | G10L 25/27 715/732 |

OTHER PUBLICATIONS

Fisher, Nick, "Read Time and You", https://blog.medium.com/read-time-and-you-bc2048ab620c, Published on: Jun. 3, 2014, 3 pages.

Hocking, Andrew, "5 tips for content creation based on website reading habits", http://www.webfirm.com/5-tips-for-content-creation-based-on-website-reading-habits-2/, Published on: Nov. 2, 2015, 7 pages.

"Get remaining reading time estimates in real-time", http://web.archive.org/web/20140828205529/http:/bevacqua.github.io/estimate, Published on: Aug. 28, 2014, 4 pages.

"Read-O-Meter", http://niram.org/read/, Published on: 2010, 1 pages.

"Email Marketing Field Guide", http://web.archive.org/web/20141120074409/http:/mailchimp.com/resources/guides/email-marketing-field-guide/html/, Published on: Nov. 20, 2014, 9 pages.

"GitHub—michael-lynch/reading-time: A simple, Lightweight jQuery Plugin used to Display an Estimated Time to Read Some Text.", Retrieved From: https://web.archive.org/web/20150216121911/https://github.com/michael-lynch/reading-time, Feb. 16, 2015, 4 pages.

"International Search Report and Written Opinion Issued in PCT Application No. PCT/US18/018577", dated May 25, 2018, 12 Pages.

* cited by examiner

ESTIMATED READING TIMES

BACKGROUND

When authoring content, authors often are faced with content limits. For example, a word limit or a page limit may be placed on a document to keep the document brief. Page count indicators and word count indicators are therefore provided to authors in content authoring applications to gauge the amount of content that has been authored. However, authors can be faced with content limits beyond word and page counts.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying instructions for providing reading time indicators within a content authoring application are provided herein. Estimates of reading times for the content item as a whole, and of sections thereof, are created as the author manipulates content within a document. These estimates are displayed as indicators within the content authoring application and the document, informing the author of how long it is expected for a reader to read and process the content. The functionality of the computing device running the content authoring application is thus improved by providing content limit indicators related to consumption time. Various options allow for changes to the estimate and the display of the indicators to be made to suit the author's preferences.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
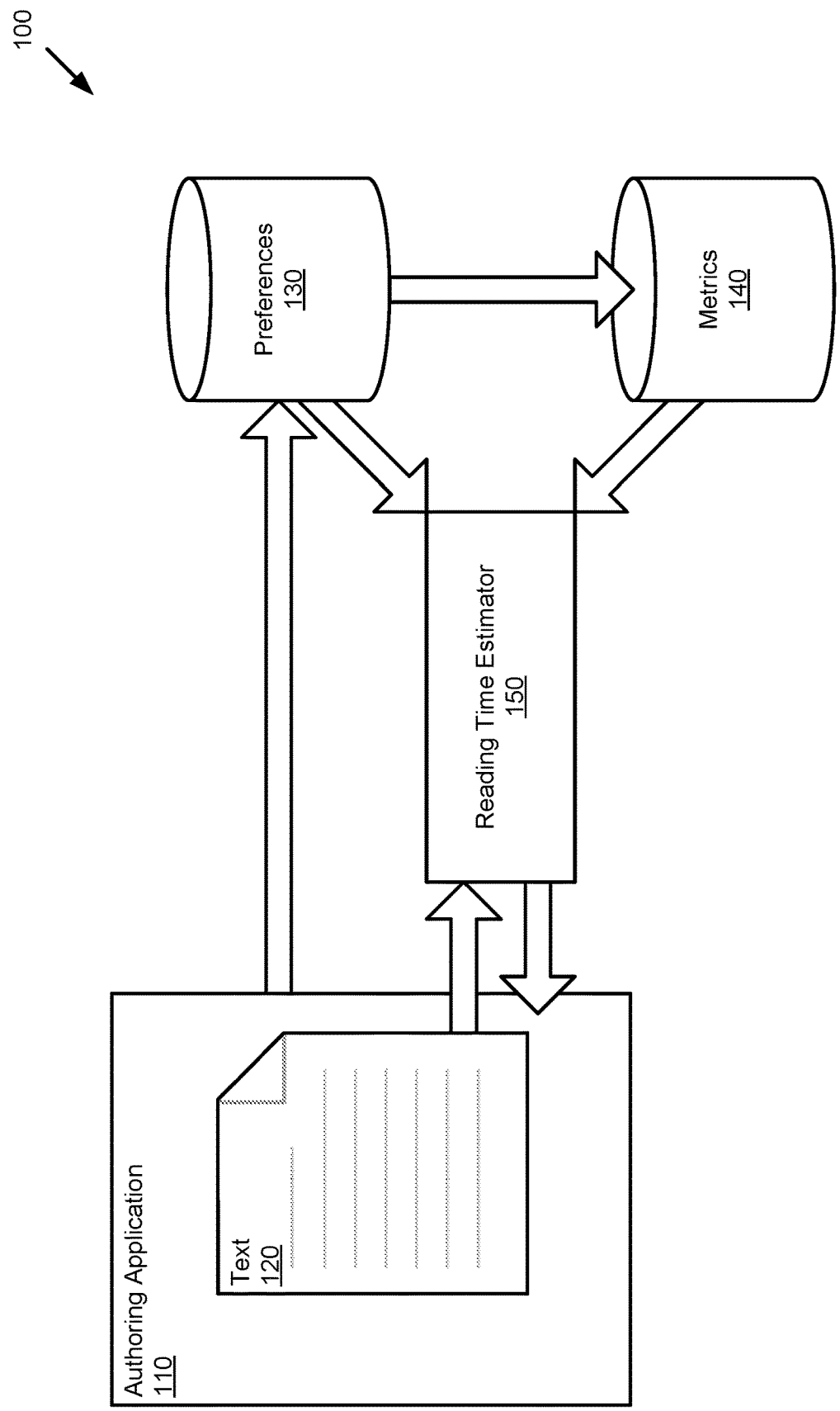
FIG. 1 illustrates and example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable storage devices embodying instructions for providing reading time indicators within a content authoring application are provided herein. Estimates of reading times for the content item as a whole, and of sections thereof, are created as the author manipulates content within a document. These estimates are displayed as indicators within the content authoring application and the document, informing the author of how long it is expected for a reader to read and process the content. The functionality of the computing device running the content authoring application is thus improved by providing content limit indicators related to consumption time. Various options allow for changes to the estimate and the display of the indicators to be made to suit the author's preferences.

FIG. 1 illustrates an example operating environment 100 in which the present disclosure may be practiced. As illustrated, an authoring application 110 hosts text 120 from a document and is in communication with a preferences store 130. The preferences store 130 includes user-defined preferences for the calculation and display of reading time estimates, which influence the metrics provided from a metrics store 140 to a reading time estimator 150. The reading time estimator 150 is configured to provide reading time estimates, based on the preferences and the metrics in relation to the text 120, for provision in the authoring application 110 and in relation to the document.

The operating environment 100 is illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4-5B.

While the operating environment 100 is discussed primarily as a single computing device, it should be noted that several configurations of multiple computing devices hosting different portions of the operating environment 100 are also possible. For example, a user device may host preference store 130 locally, but access the authoring application 110 as an online service hosted by a productivity server, and retrieve access a third server hosting the metric store 140. Various servers and intermediaries familiar to those of ordinary skill in the art may lie between the component systems illustrated in FIG. 1 to route the communications between those systems when the operating environment 100 is a distributed system, which are not illustrated so as not to distract from the novel aspects of the present disclosure.

The authoring application 110 is configured for performing a variety of tasks in various aspects, which include, but are not limited to: word processing; calculating; drawing; taking and organizing notes; preparing and organizing presentations; sending, receiving, and drafting electronic mail; and the like. Authoring applications 110 include thick client applications, which may be stored locally on a user's computing device, and thin client applications (i.e., web applications) that reside on a remote server and are accessible over a network, such as the Internet or an intranet. In various aspects, a thin client application is hosted in a browser-controlled environment or coded in a browser-supported language and is reliant on a web browser to render the authoring application 110 executable on the user's computing device. According to an aspect, the authoring application 110 is a program that is launched and manipulated by an operating system, and manages text 120 within an electronic document and is published on a display screen associated with the computing device.

The text 120 includes the context of an electronic document being manipulated by the author using the authoring application 110. The text 120 includes the textual data for document that are to be read by a reader (also referred to a body text 120), and in some aspects may include non-textual data, such as, for example, chart objects, table objects, and image objects, as well as meta-textual data, such as, for example, hyperlinks (including the address and its link text), footnotes, endnotes, comments, and alt-text. In various aspects, the non-textual data are queried to identify textual data contained therein, such as labels in a chart object, cell contents in a table object, and text recognized by Optical Character Recognition (OCR) in an image. Textual data derived from non-textual data and the meta-textual data may be handled as part of the text 120, ignored, or treated as text 120, albeit independently from the body text 120.

In various aspects, the body text 120 may be broken into sections according to breaks in the document or user selection for independent analysis. For example, each slide in a presentation document, page in a word processing document, sheet in a spreadsheet document, etc., may have its text 120 treated independently from the text 120 in other slides/pages/sheets. Similarly, sections broken apart by headers (and section breaks) may have their text 120 treated separately, so that, for example, the text 120 in an "Abstract" section is treated independently from the text 120 in a "Hypothesis" section of a word processing document. In additional aspects, a user selection of a section (e.g., highlighting a paragraph or text box) may result in the selected text 120 being treated independently from the rest of the document's or section's text 120.

How the text 120 is to be handled, and how reading time estimates are to be produced are set by various preferences stored in a preferences store 130. Various user preferences may set how non-textual data are to be handled by the reading time estimator 150, when to incorporate meta-textual data into the estimates, whether and where the estimates are to be displayed in the authoring application 110, appearance options for the indications, time divisions to use in the estimates, and the metrics to use in generating the estimates. One of ordinary skill in the art will appreciate that a multitude of user preferences are possible, and that the above are given as non-limiting examples.

The metrics store 140 provides, according to user preferences, various metrics by which an estimated reading time for the text 120 is to be generated. For example, different metrics may be provided for analyzing different languages (e.g., English, German, Japanese) or for different reading/writing styles of a given language (e.g., grade school versus collegiate reading levels, technical versus conversational writing). The various metrics specify sub-vocalization times for interpreting segments of the text 120 based on the characters and words present, as well as the surrounding effects of punctuation, capitalization, sentence structure, ruby characters/pronunciation guides, word length, spelling/construction complexity, and whitespace on the speed at which the text 120 can be interpreted by a reader. For example, for a given reading style, a baseline time to process each syllable is specified, which will be modified according to the surrounding effects throughout the text 120.

The reading time estimator 150 receives the text 120 from the authoring application 110, the stated preferences from the preferences store 130, and the preferred metrics from the metrics store 140 to produce reading time estimates, which are transmitted to the authoring application 110 for incorporation with the document being authored. The reading time estimates are produced in real-time, as the author manipulates (adds, deletes, formats, moves, etc.) content within the document. In various aspects, reading time estimates are incorporated into the Document Object Model (DOM) of the document or are generated in active memory and discarded when an authoring session ends (e.g., the authoring application 110 is closed, the email document is sent, a time estimate mode ends). When time division markers are selected for by user preferences, various pointers to the words (or portions of words or originating non-text object) that correspond to a new division may be designated for display in the User Interface (UI) of the authoring application 110, such as in FIGS. 2A-2D FIGS. 2A-2D illustrate various Graphical User Interfaces (GUI) for authoring applications 110 in which time estimates are shown for the document and time divisions thereof. Although FIGS. 2A-2D show GUIs for word processing and email applications running on desktop-style interfaces, one of ordinary skill in the art will appreciate that the concepts discussed in relation to word processing and email applications are applicable to other authoring applications 110 having different GUI layouts and features (e.g., rich text boxes in a browser application or spreadsheet application, canvases in note taking applications, mobile-style interfaces).

Figure 2A:
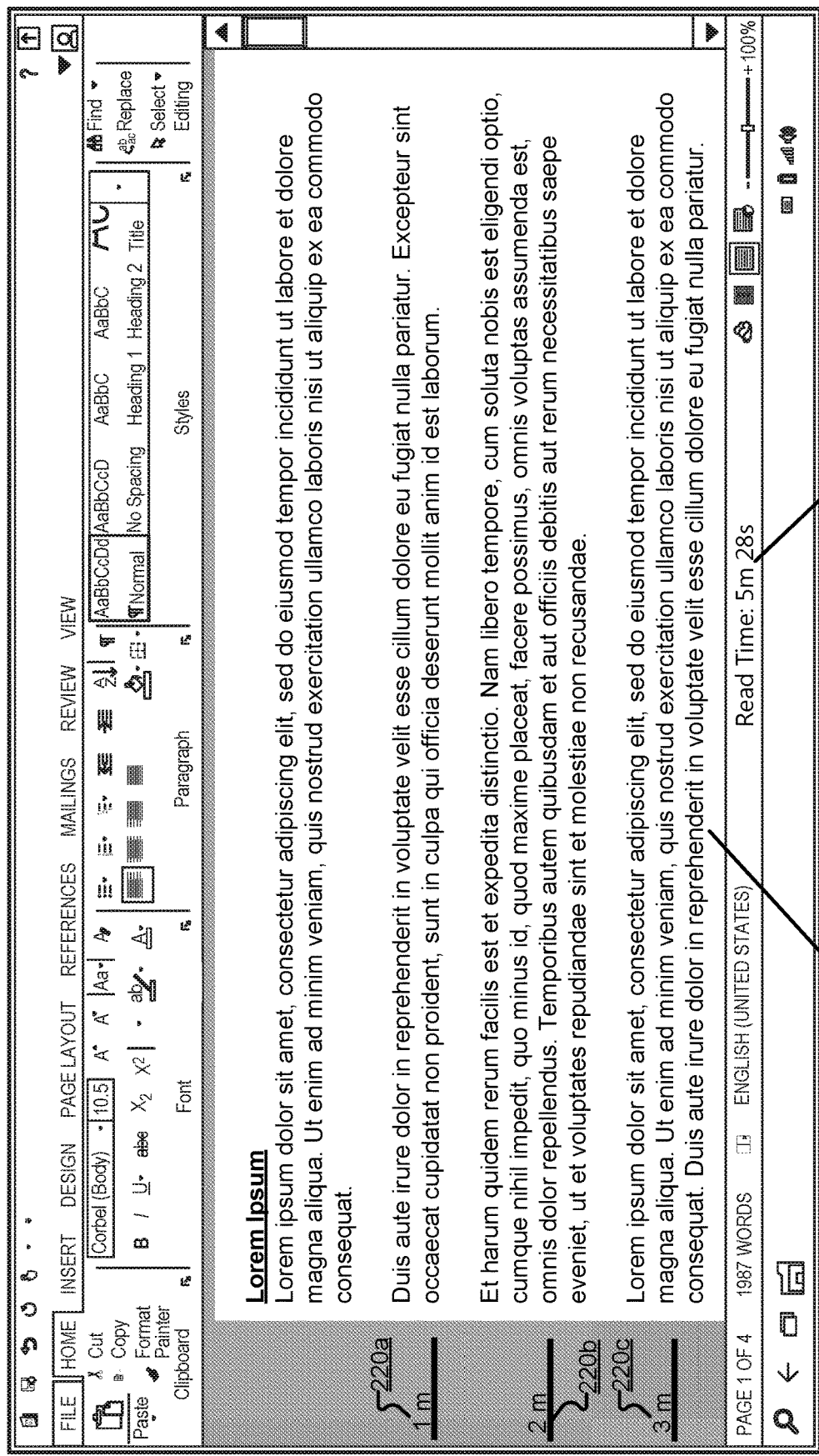
FIGS. 2A-2D are example graphical user interfaces of authoring applications showing consumption requirements.

FIG. 2A illustrates a first GUI 201 in which the text 120 of a word processing document is presented in concert with its estimated consumption times. As illustrated, a total consumption time indicator 210 of five minutes and twenty-eight seconds (5 m 28 s) is provided in a footer menu bar of the word processing authoring application 110. The time estimate included in the total consumption time indicator 210 includes the text 120 that is visible in the first GUI 201 as well as the text 120 that is not currently visible (e.g., off-page). As text 120 is manipulated in the document, the total consumption time indicator 210 is updated to reflect the new amount of time that it is estimated to read the text 120 of the document.

In addition to the total consumption time indicator 210, divisional time indicators 220 (individually, 220a-c) are shown in the first GUI 201. As illustrated, each minute of the total time is shown with an associated divisional time indicator 220 in the margin of the document aligned with the portion of the text that has reached that estimated time mark. For example, it may be estimated to take one minute to reach the word "occaecat" in the example text 120, and the first divisional time indicator 220a (for one minute divisions) is therefore shown aligned with the fifth line of the text 120; where "occaecat" appears. Similarly, it may be estimated to take an additional minute to reach the word "saepe" on the eighth line of the text 120, to which the second time indicator 220*b* is aligned.

Figure 2B:
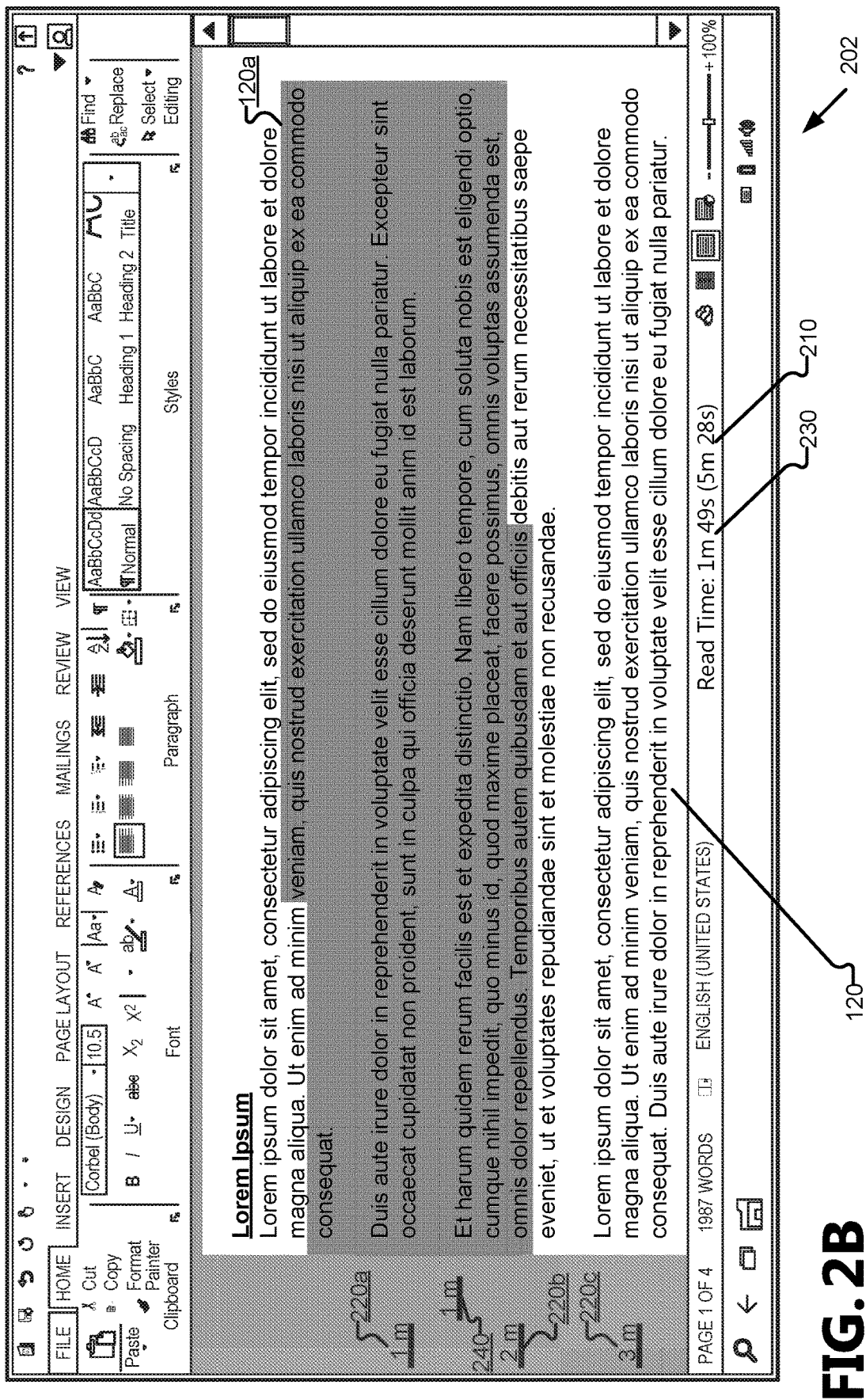

FIG. 2B illustrates a second GUI 202 for a word processor in which a selection of the text 120, selected text 120*a*, has been selected (shown in gray) in the document as a portion of the document for which to provide a reading time estimate. In addition to the total consumption time indicator 210 and divisional time indicators 220 for the text 120 (as shown in FIG. 2A), a selection time indicator 230 and one or more selection divisional time indicators 240 are shown that represent the time and time divisions estimated to consume the selected text 120*a*. In various aspects, the indicators for the text 120 and the selected text 120*a* may be co-displayed (as in FIG. 2B) or mutually exclusive in their display. In some aspects, the estimated reading time for the selected text 120*a* may be subtracted from the estimated reading time for the main text 120 to illustrate how much shorter the main text 120 would be to read were the selected text 120*a* to be removed or deleted.

In FIG. 2B, the estimated time to read the selected text 120*a* from its initial word of "veniam" to its final word of "officiis" is shown in the selection time indicator 230 to be one minute and forty-nine seconds (1 m 49 s). The one-minute mark for a division is shown via a selection divisional time indicator 240 aligned to the fifth line. The selected text 120*a* is treated independently from the main text 120, and other sections (e.g., footnotes, header text, etc.) may be treated as independent sections without being manually selected by a user, depending on user preferences.

Figure 2C:
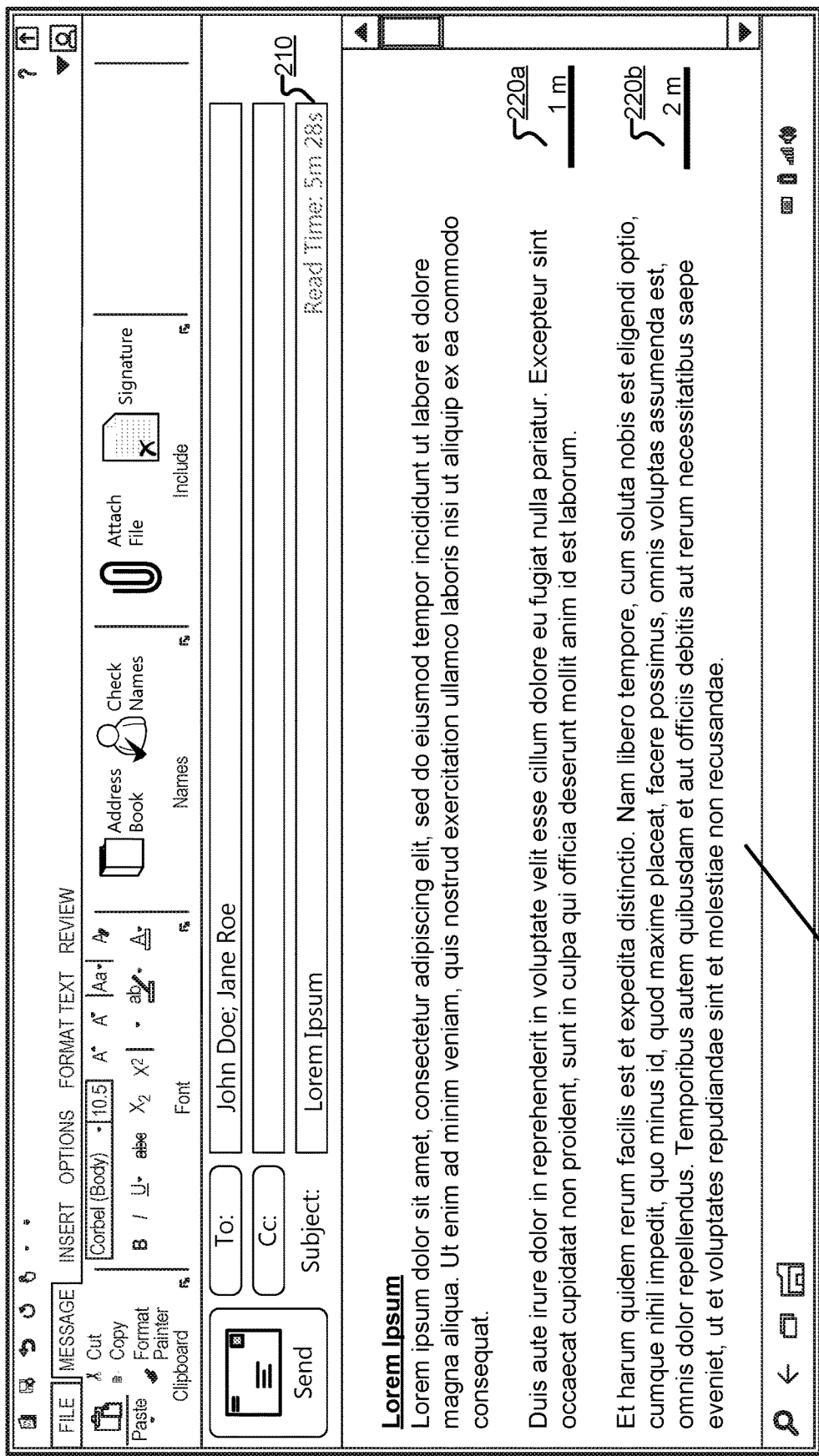

FIG. 2C illustrates a third GUI 203 in which the text 120 for a document of an email message is shown. The total consumption time indicator 210 and divisional time indicators 220 are shown in the third GUI 203 relative to the text 120, similar to as in FIG. 2A, but adapted to the UI of the different authoring application 110. For example, because the email authoring application 110 has additional fields (e.g., the "To", "Carbon Copy", and "Subject" fields) that the word processing authoring application 110 lacks, the total consumption time indicator 210 may be displayed in one of the new fields. As shown, the total consumption time indicator 210 is shown in a ghosted, non-editable entry in the Subject field, but may be displayed in other locations and manners depending on user preferences. Similarly, because the email authoring application 110 does not provide a margin, the divisional time indicators 220 are shown in free space of the text entry area other than a margin (e.g., proximate to the scroll bar).

Figure 2D:
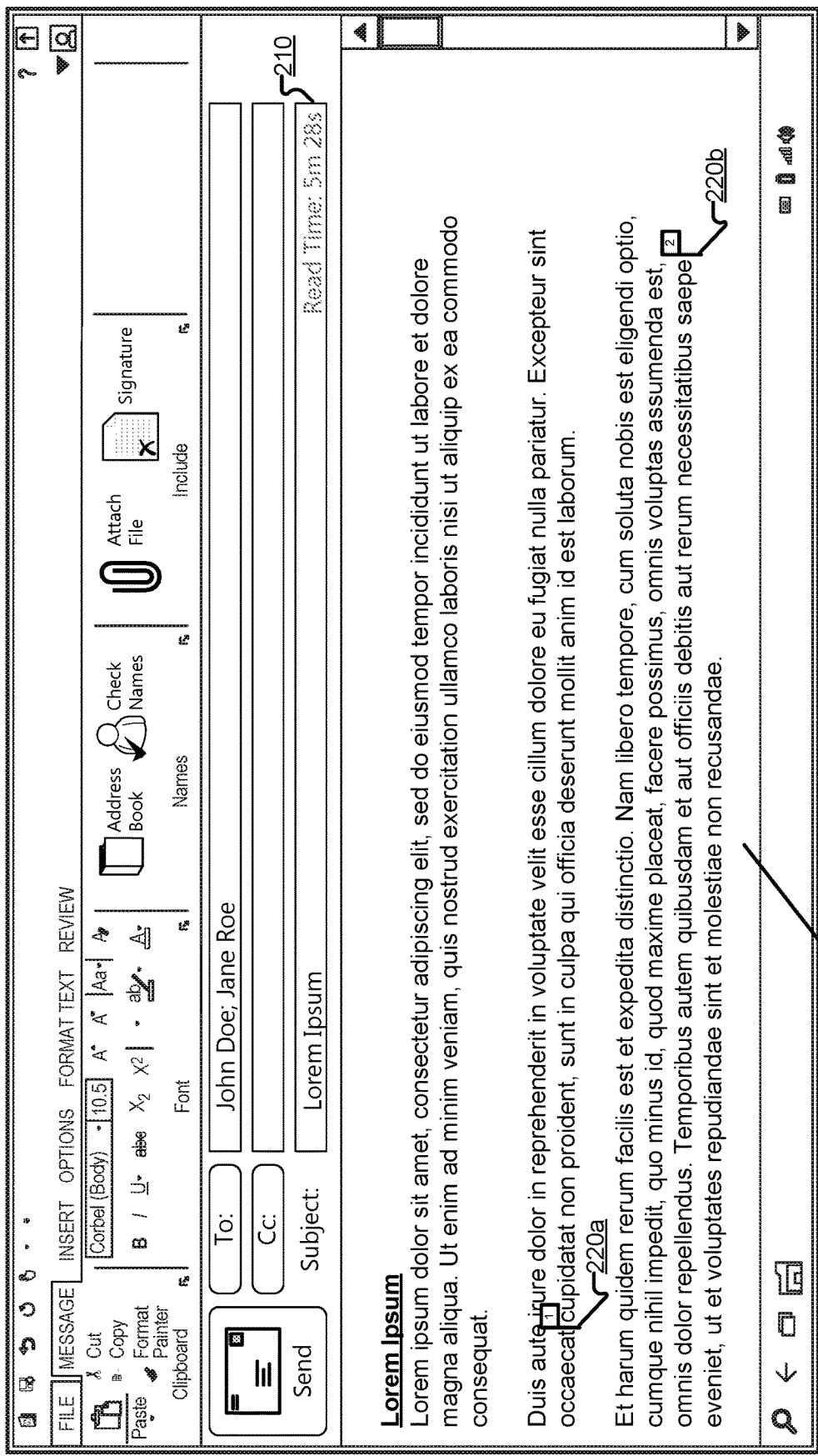

FIG. 2D illustrates a fourth GUI 204 in which the divisional time indicators 220 are shown as flags within the text 120 in line with the word associated with the time division rather than aligned with the line of text 120 to which the word associated with the time division belongs, as in FIG. 2C. As will be appreciated, the inline and line-aligned examples provided herein are non-limiting examples; other aesthetic choices may be set by user preferences specifying how and where the total consumption time indicator 210 and divisional time indicators 220 may be displayed.

Figure 3:
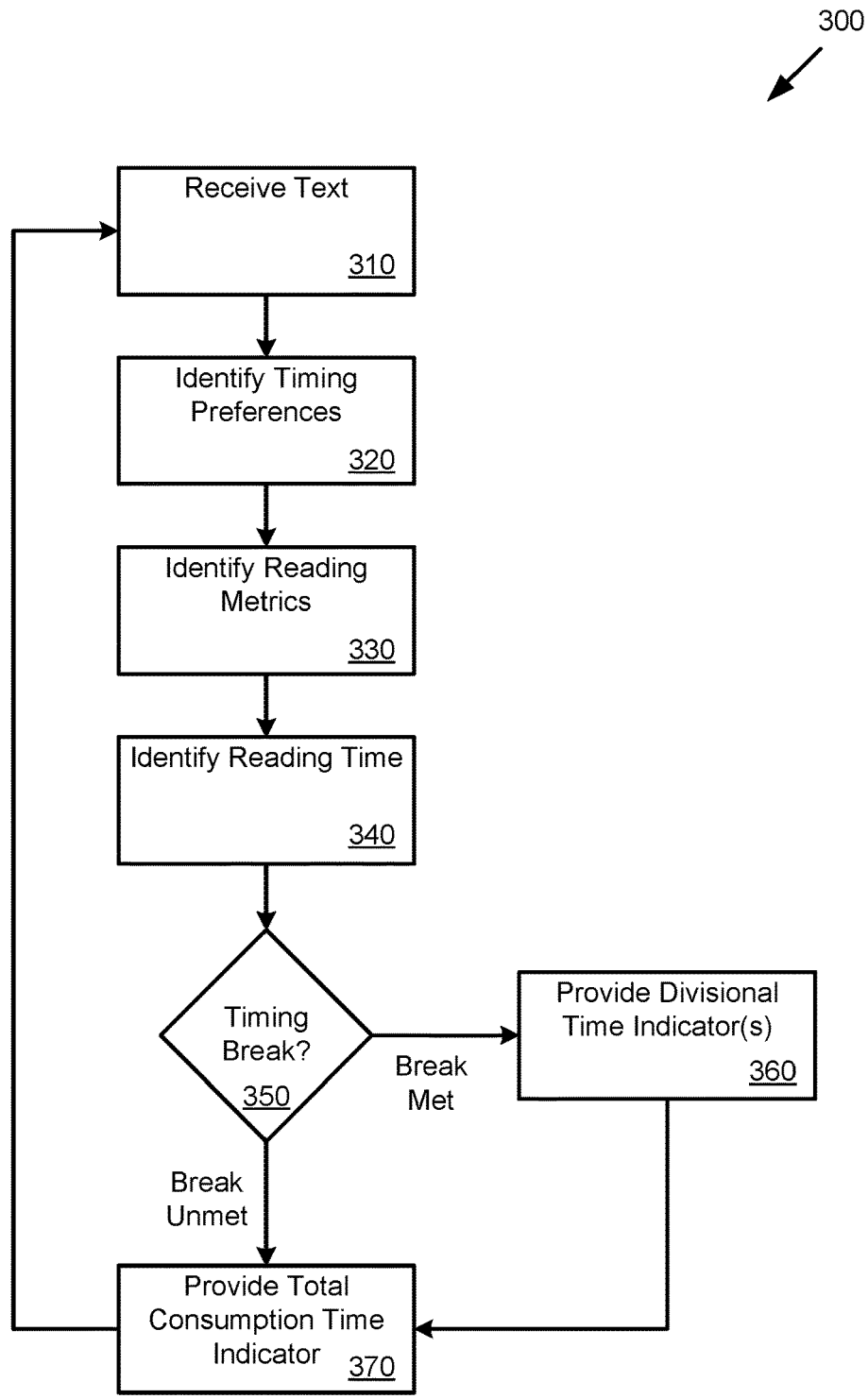
FIG. 3 is a flow chart showing general stages involved in an example method for representing consumption requirements in an authoring application.

FIG. 3 is a flow chart showing general stages involved in an example method 300 for representing consumption requirements in an authoring application 110. Method 300 begins with OPERATION 310, where text 120 is received by the reading time estimator 150. In various aspects, the text 120 is received as it is manipulated in a document for the provision of reading time estimates in real-time to the author. The text 120 may include characters and words in the body of a document, as well as, non-textual data and meta-textual data that may be parsed for textual data, ignored, or treated according to a preset time-assignment rule (e.g., all charts take x seconds to read, hyperlinks take y seconds to read, images take z second to read based on their size). Additionally, the text 120 may be received in sections that may be included or ignored in the reading time estimates, for example, a user-selected portion of the text 120, headers/footers, comments, notes, footnotes/endnotes, etc. may be treated independently from the body text 120 to provide a separate reading time estimate for the section from the body text 120.

At OPERATION 320 the timing preferences are identified for how to provision reading time estimates. The timing preferences specify whether estimates for the total reading time and/or individual time divisions (and the length of time defining a time division) are to be produced. Additionally, the reading preferences specify how various sections, non-textual data, and meta-textual data are to be handled when estimating a reading time for the text 120. Further, the reading preferences may specify an appearance and location in the authoring application 110 for the display of various indicators of reading time estimates. In various aspects, the timing preferences specify which set of reading metrics of the available reading metrics are to be selected in OPERATION 330.

Proceeding to OPERATION 330, reading metrics for use in calculating reading time estimates are identified. In various aspects, the reading preferences specify a set of reading metrics by which to evaluate how long it will take to read the text 120, such as a reading speed. The reading speed may define a baseline speed at which syllables may be read, multipliers for longer words, (e.g., reading six one-syllable words may be faster than reading one six-syllable word), effects that capitalization, formatting, punctuation, spelling/construction complexity (e.g., "through" versus "threw"), whitespace, punctuation markers, etc., have on reading speed and the like. Additionally, non-text and meta-textual data handling rules may be defined in the reading metrics, such that objects are given a reading time based on their spatial size in the document, reading times of extracted words, reading time of a portion of the object or its extracted words (e.g., the URL of "http://www.example.com" is read as "example dot com", a chart is read as its title, an image is read as its alt-text).

Method 300 then proceeds to OPERATION 340, where a reading time for the text 120 received in OPERATION 310 is identified based on the timing preferences and reading metrics identified in OPERATION 320 and OPERATION 330 respectively. The text 120 is analyzed according to the reading metrics to determine an estimated reading time for the text 120. In various aspects, the reading metrics specify a baseline speed for reading the words identified in the text 120, which may be affected by various surrounding effects, such as, for example, punctuation, capitalization, sentence structure, ruby characters/pronunciation guides, word length, and whitespace.

In some aspects, the syllables of the words are determined by the orthographic rules of the language in which the text 120 is written, but may account for non-standard spellings/constructions or irregular words via known syllabications for those words and their surrounding contexts. For example, the word "coop" in English may be read as one syllable (as a dwelling for animals, such as chickens) or as two syllables (as a shortened form of the word "co-operative"), which the reading time estimator 150 may choose between based on the context of the text 120 surrounding the word, a frequency of use of the given reading/meaning, or an average of the two syllabications (taking the equivalent time to read as 1.5 syllables in the given example). In another example, the unrecognized word "Qaepla'" may be determined to comprise two or three syllables based on the presence of two or three vowel-consonant pairs according to the orthographic rules of the selected language (Qa-ep-la versus the diphthong Qaep-la).

At DECISION 350 it is determined whether a timing break exists in the text 120. A timing break exists when the estimated reading time exceeds the division time specified in the timing preferences. For example, for a division time of n seconds, when the estimated reading time is 2n+1 seconds, two timing breaks are determined to exist at multiples of the division time—at $time_n$ and $time_{2n}$. The word that is determined to take n seconds to reach from the beginning of the text 120 (or the last time break) is set as the time break, and may be associated with the division time and a multiplier thereof (e.g., the 1n mark, the 2n mark, the 3n mark, etc.).

In response to determining that timing breaks exist in the text 120, method 300 proceeds to OPERATION 360 to provide divisional time indicators 220. Divisional time indicators 220 are provided to the authoring application 110 for each timing break for display with the text 120 at a location associated with a multiple of the division time. In various aspects, the last word in the text 120 is associated with the remainder time (e.g., the 1 second of the 2n+1 seconds) for display as a partial divisional time marker, the total estimated reading time for display as the total consumption time indicator 210, or no time indicators.

In response to determining that timing breaks do not exist in the text 120 at DECISION 350 or inserting all of the divisional time indicators at OPERATION 360, method 300 proceeds to OPERATION 370. At OPERATION 370 the total consumption time indicator 210 for the estimated time it will take to consume the text 120 is provided to the authoring application 110. In various aspects, the total consumption time is displayed in various locations of the authoring application 110 and various formatting styles according to user preferences and the GUI of the authoring application 110.

Method 300 may conclude after OPERATION 370 or return to OPERATION 310 in response to receiving additional text 120, different text 120, or modifications to the previously provided text 120. As the author modifies content in the document, updates to the reading time estimates are provided, which may change the position or various indicators and the values assigned thereto in real-time with the modifications to the content.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
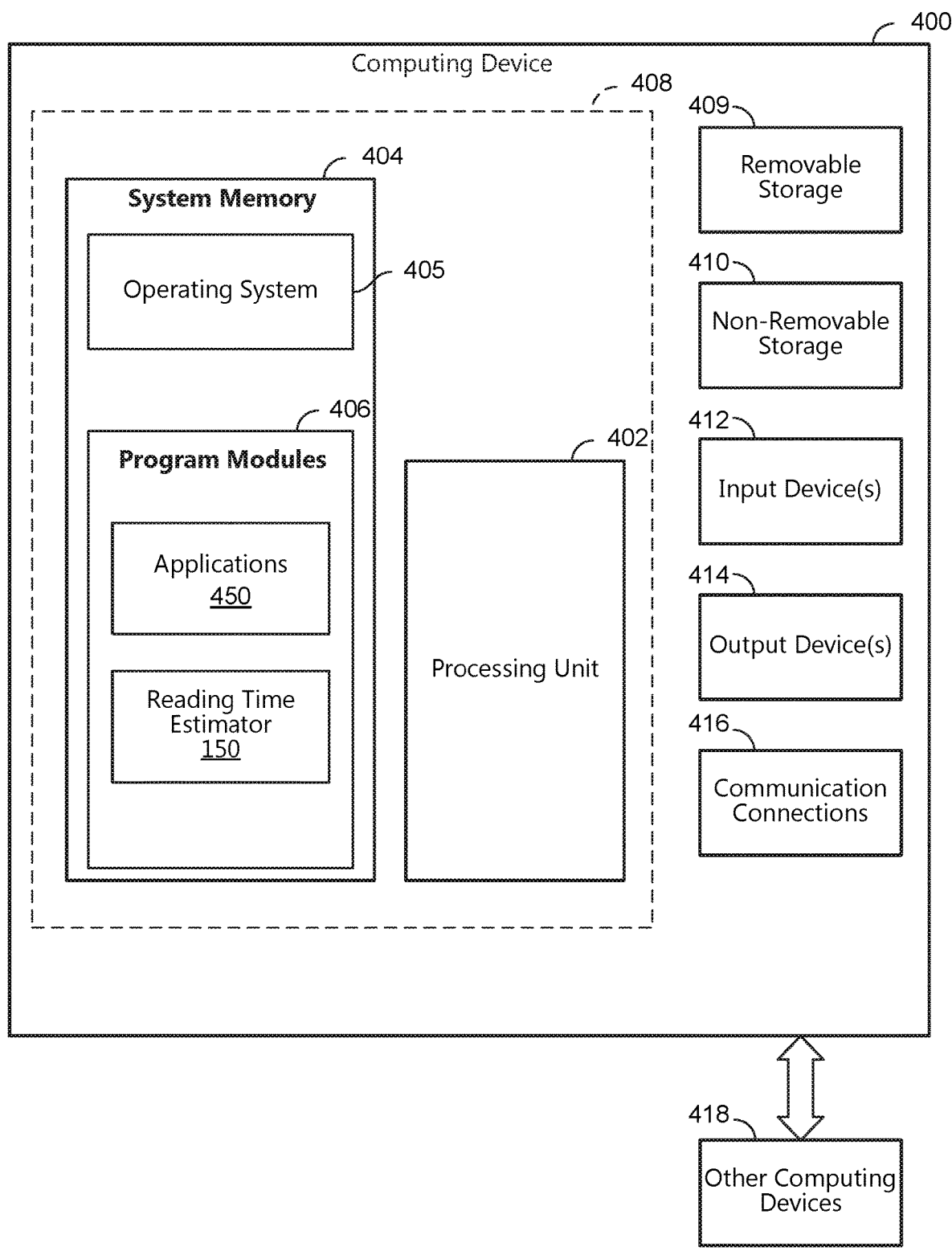
FIG. 4 is a block diagram illustrating example physical components of a computing device.
Figure 5A:
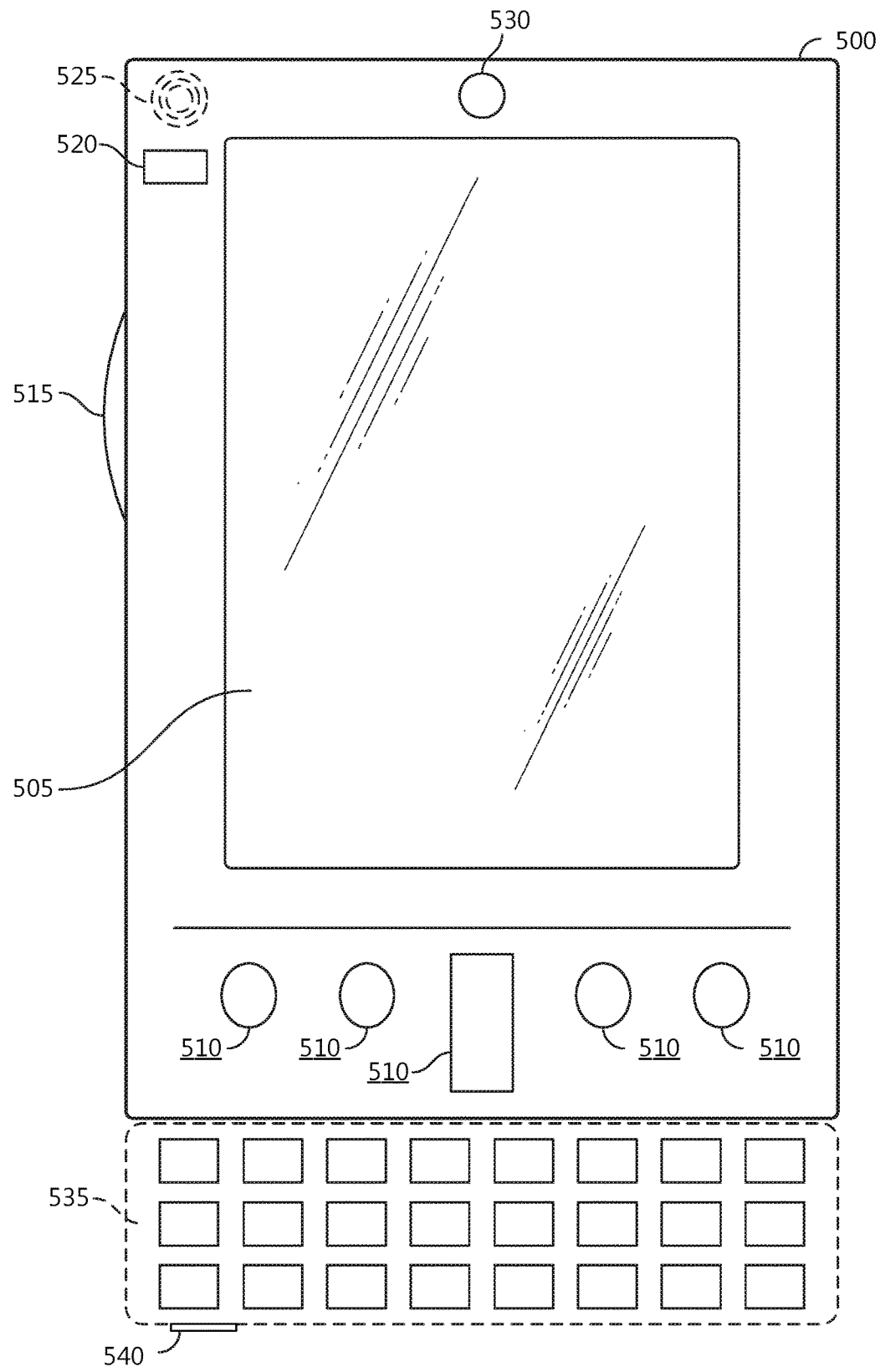
FIGS. 5A and 5B are block diagrams of a mobile computing device.
Figure 5B:
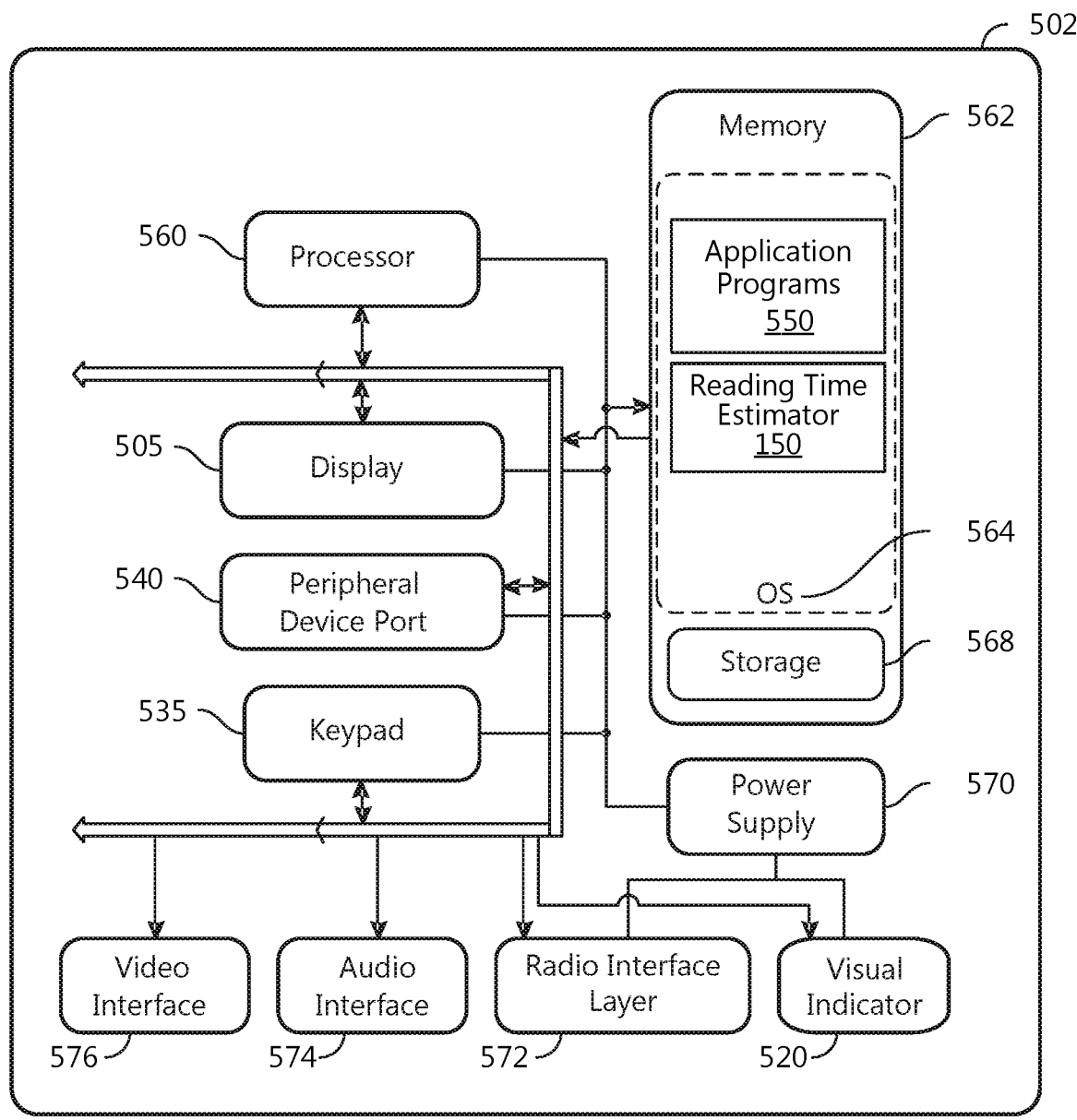

FIGS. 4-5B and the associated descriptions provide a discussion of a variety of operating environments in which examples are practiced. However, the devices and systems illustrated and discussed with respect to FIGS. 4-5B are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes reading time estimator 150. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., reading time estimator 150) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, reading time estimator 150 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method for representing consumption requirements in an authoring application, comprising:
   receiving content from a document created by the authoring application while the content of the document is being added or deleted within the authoring application;
   identifying timing preferences;
   identifying a metric from which to determine a reading time of the content, the identified metric being selected from:
      a plurality of reading style metrics; or
      a plurality of writing style metrics;
   wherein a baseline time to process a syllable within the content changes according to the identified metric;
   determining a non-spoken reading time of the content based on the timing preferences and the identified metric; and
   displaying a total consumption time indicator in the authoring application based on the non-spoken reading time of the content.

2. The method of claim 1, further comprising:
   wherein identifying the timing preferences includes identifying a division time;
   determining whether the reading time exceeds the division time;
   in response to the reading time exceeding the division time, providing a division time indicator for the content at a location associated with a multiple of the division time.

3. The method of claim 2, wherein the location associated with the multiple of the division time is a line of the content identified with a time to consume indicated by the division marker.

4. The method of claim 1, wherein the content includes:
   body text;
   textual data included in non-text objects; and
   meta-textual data.

5. The method of claim 4, wherein the non-text objects include:
   images, wherein the textual data are extracted according to Optical Character Recognition;
   tables, wherein the textual data are included in cells of the tables; and
   charts, wherein the textual data are included as labels to the charts.

6. The method of claim 4, wherein the meta-textual data include:
   hyperlinks;
   footnotes;
   endnotes; and
   comments.

7. The method of claim 1, wherein the timing preferences specify a position in the authoring application to display indicators.

8. The method of claim 1, wherein the timing preferences exclude from the content one or more of: footnotes, endnotes, headers, footers, comments, and notes.

9. The method of claim 1, wherein the reading metrics specify a reading speed.

10. A system for representing consumption requirements in an authoring application, comprising:
   a processor; and
   a memory including instructions, that when executed by the processor are operable to:
      accept content from a document created by an authoring application while content of the document is being added or deleted within the authoring application,
      identify reading preferences from a preferences store;
      identify a metric from which to determine a non-spoken reading consumption time of the content from a metrics store, the identified metric being user-selected from:
         a plurality of reading style metrics; or
         a plurality of writing style metrics;
      wherein including a baseline time to process a syllable within the content changes according to the identified metric;
      determining the non-spoken reading consumption time of the content, while the content of the document is being added or deleted, based on the reading preferences and the identified metric; and
      generating and displaying a non-spoken reading consumption time indicator in the authoring application in association with the determined non-spoken reading consumption time of the content;
      and
      wherein the reading preferences specify a time division at which to produce a divisional time indicator according to the determined non-spoken reading consumption time of the content.

11. The system of claim 10, wherein the reading preferences further specify the identified metric.

12. The system of claim 10, wherein the reading preferences further specify whether to ignore or include non-textual data and meta-textual data when determining the consumption times of the content.

13. The system of claim 10, wherein the reading time indicators include the divisional time indicators, total consumption time indicators, and selection time indicators.

14. An article of manufacture in the form of a computer readable storage device including processor executable instructions for representing consumption requirements in an authoring application, comprising:
   receiving content from a document created by the authoring application while content of the document is being added or deleted within the authoring application;
   identifying timing preferences, including a time division;
   identifying a metric from which to determine a non-spoken reading time of the content, the identified metric being selected from:
      a plurality of reading style metrics; or
      a plurality of writing style metrics;
   wherein a baseline time to process a syllable within the content changes according to the identified metric;
   determining the non-spoken reading time of the content based on the identified metric and the timing preferences, while the content of the document is being added or deleted; and
   providing divisional time indicators in the authoring application based on the non-spoken reading time of the content and the time division.

15. The article of manufacture of claim 14, wherein the content includes:
   body text;
   textual data included in non-text objects; and
   meta-textual data.

16. The article of manufacture of claim 14, wherein the divisional time indicators are displayed inline in a graphical user interface with a word associated with a multiple of the time division in the reading time.

17. The method of claim 1, wherein providing the total consumption time indicator in the authoring application includes displaying the total consumption time indicator in a same user interface of the authoring application that is enabling editing of the content of the document.

18. The method of claim 1, wherein the authoring application comprises at least one of: a word processing application; a calculating application; a drawing application; a notes application; a presentation application, and an electronic mail application.

19. The method of claim 1, wherein the identified metric includes a content analysis metric based on a language of the content.

20. The method of claim 1, wherein each of the plurality of reading style metrics is defined according to an educational level of an anticipated reader of the content.

21. The method of claim 1, wherein each of the plurality of writing styles is defined according to a level of technicality associated with the content.

* * * * *